United States Patent
Meyer et al.

(10) Patent No.: US 9,644,688 B2
(45) Date of Patent: May 9, 2017

(54) CLUTCH FOR AN AUTOMATIC TRANSMISSION

(71) Applicant: ZF Friedrichshafen AG, Friedrichshafen (DE)

(72) Inventors: Lars-Erik Meyer, Meersburg (DE); Gerhard Spindler, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 1 day.

(21) Appl. No.: 14/686,162

(22) Filed: Apr. 14, 2015

(65) Prior Publication Data
US 2016/0091030 A1    Mar. 31, 2016

(30) Foreign Application Priority Data
Sep. 27, 2014  (DE) .................. 20 2014 007 839

(51) Int. Cl.
| F16D 13/52 | (2006.01) |
| F16D 13/68 | (2006.01) |
| F16D 13/58 | (2006.01) |

(52) U.S. Cl.
CPC ........... F16D 13/52 (2013.01); F16D 13/683 (2013.01); F16D 13/585 (2013.01)

(58) Field of Classification Search
CPC .... F16D 25/052; F16D 25/585; F16D 25/062; F16D 25/063; F16D 25/0635; F16D 25/0638; F16D 25/064
See application file for complete search history.

(56) References Cited

U.S. PATENT DOCUMENTS

| 5,261,517 A * | 11/1993 | Hering ................. F16D 25/123 192/56.2 |
| 7,311,463 B2 * | 12/2007 | Haupt .................. F16B 21/183 192/70.2 |
| 2004/0228680 A1 * | 11/2004 | Loe ..................... F16D 25/0638 403/325 |
| 2008/0060904 A1 * | 3/2008 | Nukata .................. F16D 13/52 192/106 R |
| 2015/0226272 A1 * | 8/2015 | Heuver ................. F16D 13/646 192/66.3 |
| 2015/0345635 A1 * | 12/2015 | Heuver ............... F16H 63/3026 192/70.11 |

FOREIGN PATENT DOCUMENTS

DE    10 2009 060351    6/2011

* cited by examiner

*Primary Examiner* — Jacob S Scott
*Assistant Examiner* — Lori Wu
(74) *Attorney, Agent, or Firm* — Dority & Manning, P.A.

(57) ABSTRACT

A clutch for an automatic transmission for a motor vehicle includes a clutch housing and a retaining ring. In an inner circumferential surface of the clutch housing concentrically at a central axis (M) of the cylinder jacket-shaped inner circumferential surface, a ring groove that is open radially inward is formed, within which the retaining ring is arranged. The retaining ring is thereby open and features two spaced ends. In the area of the ring groove, at least one stop is formed, whereas a distance between the ends from each other or the position of the stop is selected in such a manner that, in the assembled state, only one end of the retaining ring may come into contact with a stop, while the other end is spaced from this stop or an additional stop.

7 Claims, 2 Drawing Sheets

CLUTCH FOR AN AUTOMATIC TRANSMISSION

FIELD OF THE INVENTION

The invention relates to a clutch for an automatic transmission, and an automatic transmission incorporating the clutch.

BACKGROUND

With clutches for automatic transmissions for motor vehicles, the movable clutch components axially mounted in clutch housings, such as clutch plates, pressure disks or disk springs, are axially supported by means of retaining rings or are limited in their axial movement. Thereby, the retaining ring itself is to be secured against loosening, rotation or jumping out.

Such a clutch for an automatic motor vehicle transmission is known from DE 10 2009 060 351 A1. Thereby, the retaining ring features a multitude of so-called "securing teeth" that are directed radially outward, which engage in slots that are formed in the clutch housing. The retaining ring is thus axially supported and secured against rotation by means of the securing teeth.

In a disadvantageous manner, this solution requires a high processing effort with the clutch housing, since this is to be provided with slots, which must precisely match the securing teeth. In addition, the retaining ring itself is a complex component, since it is to be provided with a multitude of precisely positioned securing teeth.

SUMMARY OF THE INVENTION

Therefore, a task underlying the invention is to create a clutch with which, in a simple manner, a secure fit of a retaining ring in its ring groove is ensured during operation. In particular, the retaining ring must be secured against rotation and jumping out of the ring groove. Additional objects and advantages of the invention will be set forth in part in the following description, or may be obvious from the description, or may be learned through practice of the invention.

Accordingly, a clutch for an automatic transmission, in particular for a motor vehicle, includes a clutch housing, clutch plates and a retaining ring. The clutch housing forms a cylindrical internal space for receiving the clutch plates, the space bounded by a cylinder jacket-shaped inner circumferential surface of the clutch housing. A clutch housing designed in such a manner is also called an outer multi-disk carrier. A ring groove that is open radially inward, within which the retaining ring is arranged, is formed in the inner circumferential surface, whereas the ring groove and the retaining ring are arranged concentrically at a central axis of the cylinder jacket-shaped inner circumferential surface of the clutch housing. The retaining ring is open and features two spaced ends. In the area of the ring groove, at least one stop for the ends of the retaining ring is formed, upon which they can hit upon a rotation within the ring groove.

In accordance with the invention, a distance of the ends from each other and the position of the stop to each other are selected in such a manner that, in the assembled state, only one end of the retaining ring may come into contact with a stop, while the other end is spaced from this stop or an additional stop.

Thus, for example, with a given distance between the ends of the retaining ring, the position of the stop or the stops can be selected in such a manner that, upon a rotation of the retaining ring around the central axis within the ring groove, only one end strikes on a stop, while the other end is spaced from any gap, or that, with a given position of the stop or stops, the distance between the ends is correspondingly selected. Thus, it is advantageously ensured that the retaining ring is secured against a rotation, without any tension being able to take place within the retaining ring, which could reduce its outer diameter.

Advantageous arrangements of the invention are set forth in greater detail herein.

An arrangement by which the retaining ring for axial support (i.e., for support in the direction of the central axis) has an additional component of the clutch is provided. Through this component, a circumferential force on the retaining ring is effective during operation, which presses the front end of the retaining ring against the stop in respect of the direction of the circumferential force. A circumferential force is hereinafter understood as a force acting in a tangential direction.

In a preferred arrangement of the invention, the additional component is a disk spring.

In an advantageous arrangement of the invention, it is possible that recesses are formed in the inner circumferential surface and/or the ring groove, and that the ends of the retaining ring are bent radially outward and, in the assembled state, are located outside of an outer diameter of the ring groove, whereas the stop for the front end of the retaining ring is formed by the clutch housing in the transition from the inner circumferential surface to a recess. Advantageously, the stop, which is located outside the groove, is thereby produced in a simple manner, and the ring groove is produced as an undercutting or a cut-in.

In a particular arrangement, it is possible that the distance between the ends and the positions and sizes of the recesses to each other are selected in such a manner that, if the front end is located at the associated stop under the effect of the circumferential force, a rear end of the retaining ring is located in a recess in respect of the direction of the circumferential force. Thereby, the rear end is spaced from a stop so far that the retaining ring, which is pushed from the rear end under the circumferential force, can be widened until the retaining ring, which can be pressed radially outward into the ring groove, at least partially makes contact with a groove base. Thus, the retaining ring makes contact with the groove base before the rear end can make contact with any stop. Thus, it is advantageously ensured that the retaining ring, under a deformation due to the circumferential force, cannot jump out of the ring groove, since the retaining ring is clearly pressed into the ring groove and held there.

It is also possible that, in the inner circumferential surface, an internal toothing is formed to guide outer disks, whereas the recesses are formed as spaces in the internal toothing. Thereby, the diameter of the cylinder jacket-shaped inner circumferential surface corresponds to the tip diameter of the internal toothing.

Preferably, it is possible that an automatic transmission for a motor vehicle comprises at least one clutch that is arranged as described above, whereas the clutch housing is connected to the transmission housing in a torque-proof manner. Thereby, a transmission housing is understood to be a housing that surrounds and encloses all transmission components, including the clutches. With such an arrangement, the clutch is also referred to as a brake, since, upon its actuation, it reduces the rotational speed of a rotating transmission component, or brings it completely to a standstill, and/or it is connected to the transmission housing in a torque-proof manner.

In a particularly advantageous arrangement of the invention, it is possible that the clutch comprises, in addition to the clutch housing, the retaining ring and the disk spring, a clutch piston, clutch plates and a pressure plate, whereas the clutch piston is movable axially against the pressure plate and the disk spring under a clutch piston force. Upon the movement, which extends up to the contact of the clutch piston at the pressure plate, the clutch plates are to be pressed to each other for the transfer of turning moment. Thereby, the disk spring is prestressed between the retaining ring axially fixed in the clutch housing, since this moves the clutch piston into its initial position with a stored prestressing force upon the opening of the clutch. With this arrangement, the disk spring is advantageously supportable axially against the clutch housing by the retaining ring, and the clutch plates and the pressure plate can be disassembled after removing the retaining ring from the clutch housing.

In an advantageous arrangement of such an automatic transmission, it is possible that the clutch housing and the transmission housing are formed in one piece. Thereby, installation work is eliminated, the overall stiffness of the structure is increased and the clutch housing and the transmission housing can be manufactured as a complete unit by casting.

BRIEF DESCRIPTION OF THE DRAWINGS

Embodiments of the clutch in accordance with the invention are shown in the drawings and are described in detail below.

The following is shown.

DETAILED DESCRIPTION

Figure 1:
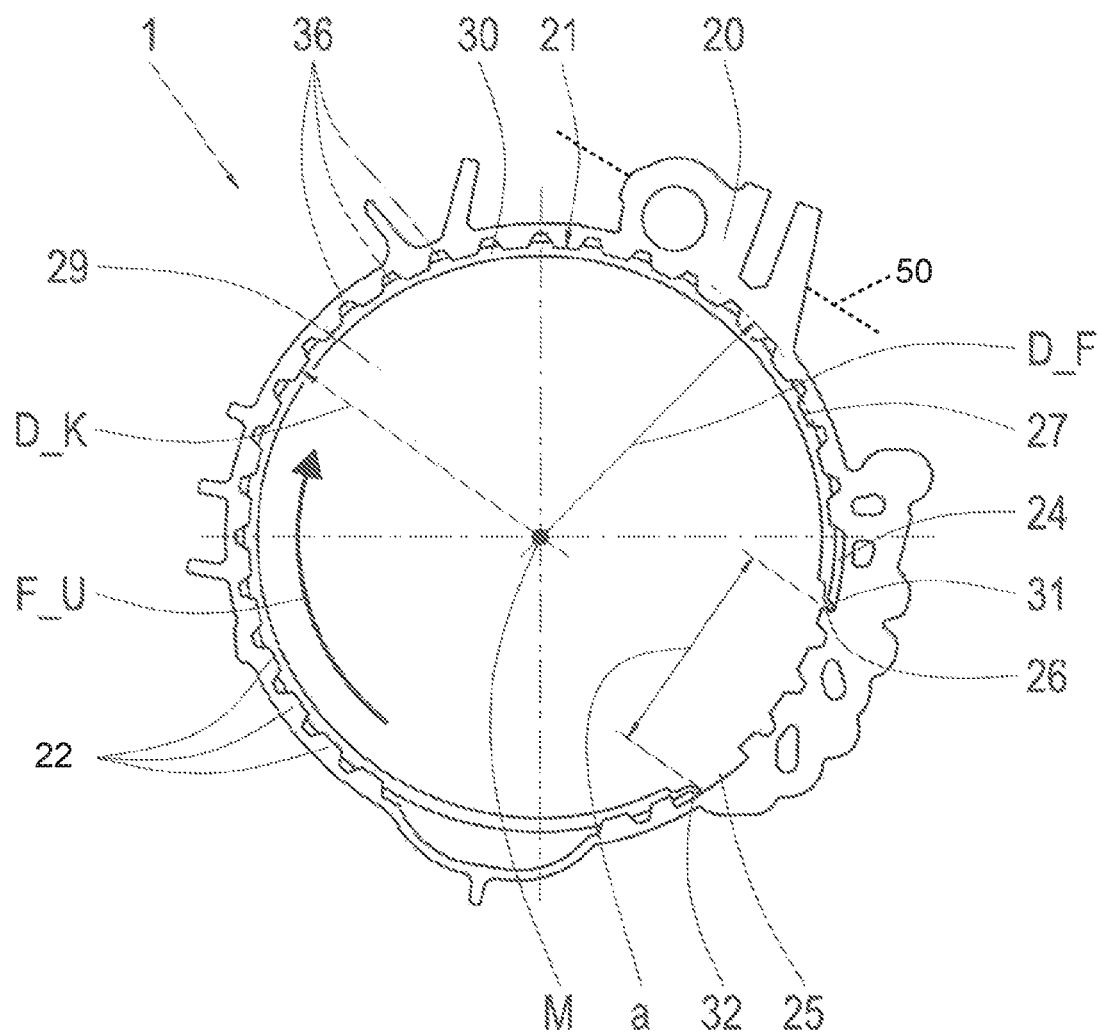
FIG. 1 is a view of a clutch in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a view in an axial direction of a clutch 1 in accordance with the invention. From the clutch 1, a clutch housing 20 and a retaining ring 30 mounted in the clutch housing 20 are shown.

The clutch housing 20 forms a cylindrical internal space 29. On the inside of the clutch housing 20, a cylinder jacket-shaped inner circumferential surface 21 is formed, the center of which has a central axis M. In addition, the central axis M is also the axis of rotation of the rotating components of the clutch 1. An "axial" direction is hereinafter understood as "in the direction of the central axis M." In the inner circumferential surface 21, an internal toothing 22 is also formed concentric to the central axis M. The diameter of the cylinder jacket-shaped inner circumferential surface 21 corresponds to a tip diameter $D\_K$ of the internal toothing 22. Concentric to the central axis M, the inner circumferential surface 21 in the clutch housing 20 forms a ring groove 27, which features a groove base 28 with an outer diameter $D\_R$ as a radial extension and a ring groove width b as an axial extension in the clutch housing 20. The outer diameter of the ring groove $D\_R$ is larger than the tip diameter $D\_K$ and smaller than a root diameter $D\_F$ of the internal toothing 22. The ring groove 27 is interrupted from the tooth spaces 36 of the internal toothing 22 and the recesses in the internal toothing 22 in the form of spaces 24 and 25, whereas the spaces 24 and 25 feature a tangential extension that is larger than the tooth spaces 36. In the embodiment shown, the ring groove 27 is formed as an undercutting in terms of manufacturing technology The distance of the clutch housing 20 from the central axis M in the area of the spaces 24 and 25 corresponds at least to half of the root diameter $D\_F$. In the assembled state, the outer diameter of the elastic retaining ring 30 inserted into the ring groove 27 corresponds to the outer diameter $D\_R$ of the ring groove 27, since the elastic forces of the retaining ring 30 prestressed in the assembled state act in a radial direction, and press the ring 30 against the groove base 28 formed in the clutch housing 20.

The retaining ring 30 is open and features two ends 31 and 32 spaced apart from each other, which are bent radially outward, such that, in the assembled state, they are located outside the outer diameter $D\_R$ of the ring groove 27. The positions of the spaces 24 and 25 are selected in such a manner that, in the assembled state, the ends 31 and 32 are arranged in them.

If the retaining ring 30 in its ring groove 27 rotates around the central axis M, the ends 31 or 32 at the end of the spaces 24 or 25 hit against the teeth of the internal toothing 22, such that the outwardly bent ends 31 and 32 serve as anti-rotation protection according to the state of the art.

In the embodiment shown, the end 31 is arranged in the space 24, and the end 32 is arranged in the space 25. Thereby, the end 31 makes contact at a stop 26 formed by the contour of the space 24 in the clutch housing 20. However, the location and tangential extension of the space 25 are selected in such a manner that the end 32 is spaced from every stop and thus has tangential degrees of freedom.

Figure 2:
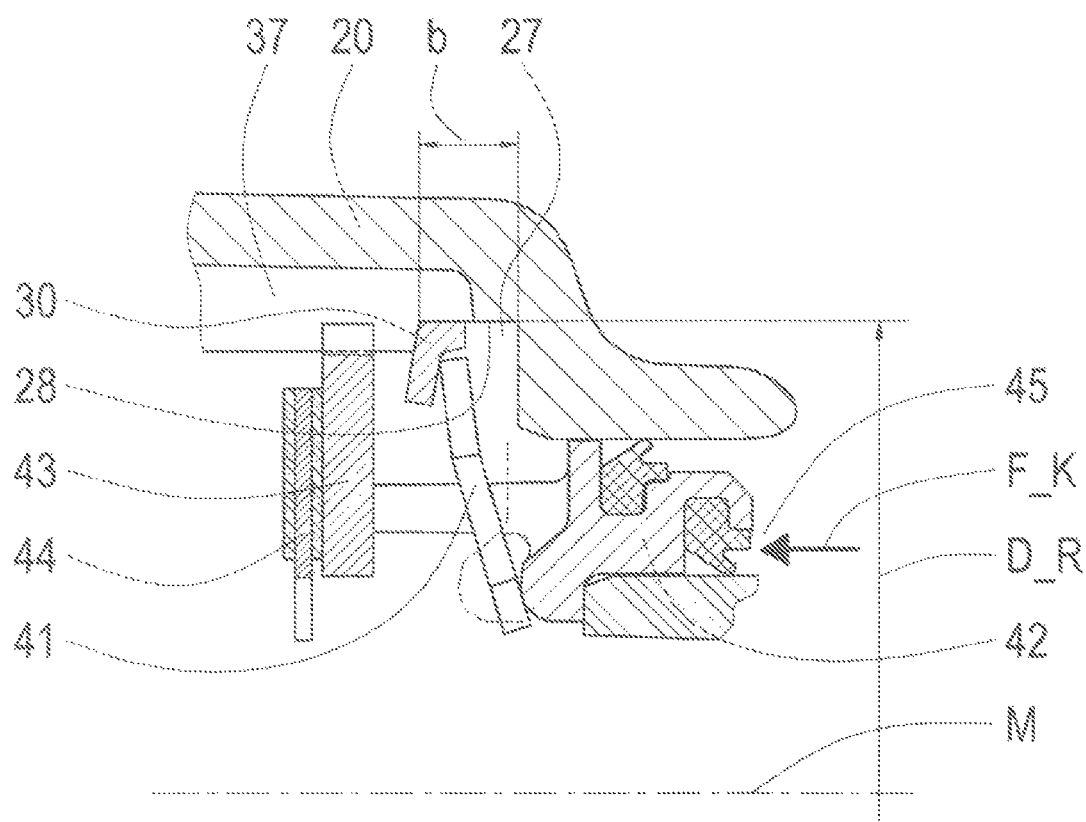
FIG. 2 is a cut-out from a longitudinal cut of the clutch in accordance with the invention

FIG. 2 shows a cut-out from a longitudinal cut of the clutch in accordance with and embodiment of the invention. Thereby, a pressure plate 43 of the clutch plates 44, the retaining ring 30, a disk spring 41 and a clutch piston 42 are arranged axially adjacent and concentric to the central axis M. The pressure plate 43 is arranged in the internal toothing 22 in an axial displaceable manner in the clutch housing 20, and is coupled with it in a torque-proof manner through the internal toothing 22.

The clutch piston 42 can be applied with hydraulic pressure in a pressure chamber 45 and, under the axially directed clutch piston force $F\_K$ arising from this, is displaceable from its initial position shown in FIG. 2 against the pressure plate 43. Upon the contact of the clutch piston 42 at the pressure plate, this pushes the clutch plates 44 against each other and thus enables the transmission of a turning moment, or, in the case of a clutch designed as a brake, the setting or braking of a rotating transmission component. In the present embodiment, the clutch housing 20 is firmly connected to the transmission housing 50 (shown schematically in FIG. 2), and is designed together with this as one piece, such that the clutch 1 is as effective as a brake.

Upon the stroke of the clutch piston 42 in the direction of the pressure plate 43, this prestresses the disk spring 41 with a part of the clutch piston force $F\_K$. Upon opening the clutch, initiated by a reduction in the hydraulic pressure in the pressure chamber 45, the disk spring 41 pushes the clutch piston 42 back into its initial position prior to the closing of the clutch 1. The disk spring 41 is supported against the prestressed component of the clutch piston force F_K axially through the retaining ring 30 against the clutch housing 20.

Since, in the embodiment shown, a differential rotational speed between the clutch piston 42 and the clutch housing 20 may be present, or the clutch housing 20 is connected to the transmission housing 50 in a torque-proof manner and the clutch piston 42 rotates, through the friction existing between it and the retaining ring 30, upon a rotation, the disk spring 41 exercises a circumferential force F_U on the retaining ring 30 in the direction of rotation shown in FIG. 1.

Upon a rotation of the retaining ring 30 in its ring groove 27, the end 31 forms a front end in respect of the direction of rotation and comes into contact with the stop 26 in the manner shown. The circumferential force F_U displaces the rear end 32 within the space 25 in respect of the direction of the circumferential force F_U, which is selected to be so large that the end 32 does not come into contact with any stop, such that the retaining ring 30 is widened by the circumferential force F_U in a radial direction, and is at least partially pressed with its circumference against the groove base 28. Thereby, under a circumferential force F_U, a radial contraction and an associated jumping out of the retaining ring 30 from the ring groove 27 is counteracted.

Modifications and variations can be made to the embodiments illustrated or described herein without departing from the scope and spirit of the invention as set forth in the appended claims.

REFERENCE SIGNS

1 Clutch
20 Clutch housing
21 Inner circumferential surface
22 Internal toothing
24 Space
25 Space
26 Stop
27 Ring groove
28 Groove base
29 Internal space
30 Retaining ring
31 Front end
32 Rear end
36 Tooth spaces
37 Teeth
41 Disk spring
42 Clutch piston
43 Pressure plate
44 Clutch plates
45 Pressure chamber
50 Transmission housing
a Distance between the ends
b Ring groove width
D_F Root diameter
D_K Tip diameter
D_R Outer diameter of the ring groove 27
F_K Clutch piston force
F_U Circumferential force
M Central axis

The invention claimed is:

1. A clutch for an automatic transmission in a motor vehicle, the clutch comprising:

a clutch housing, the clutch housing forming a cylindrical internal space bounded by a cylinder inner circumferential surface;
clutch plates received within the internal space;
a ring groove that is open radially inward formed in the inner circumferential surface;
recesses formed in the ring groove radially outside or an outer diameter of the ring groove;
a retaining ring arranged in the ring groove, the retaining ring having an open circumference with two spaced ends;
the ring groove and the retaining ring arranged concentrically at a central axis of the cylinder inner circumferential surface;
one or more stops formed in the ring groove; and
wherein a distance between the spaced ends and a distance from the spaced ends to the one or more stops are selected such that, in an assembled state, only one of the spaced ends of the retaining ring comes into contact with one of the one or more stops, while the other respective spaced end of the retaining ring is spaced from the one of the one or more stops,
wherein the retaining ring is provided for axial support of an additional component of the clutch that exerts a circumferential force on the retaining ring during operation, the retaining ring thereby rotatable in the ring groove until a front one of the spaced ends of the retaining ring relative to a direction of the circumferential force makes contact with the one of the one or more stops, and
wherein the spaced ends of the retaining ring bent radially outward and each extending radially into a respective one of the recesses, the one of the one or more stops for the front one of the spaced ends of the retaining ring is formed by the clutch housing at a transition from the ring groove to the recess.

2. The clutch according to claim 1, wherein the additional component is a disk spring.

3. The clutch according to claim 1, wherein the distance between the spaced ends and relative positions and sizes of the recesses are selected such that, when the front one of the spaced ends is located at the one of the one or more stops under due to the circumferential force, a rear one of the spaced ends is located in a respective recess and is spaced from another one of the one or more stops associated with the respective recess so far that the retaining ring widens under the circumferential force and is pressed radially outward into the ring groove.

4. The clutch according to claim 3, further comprising an internal toothing formed in the inner circumferential surface to guide an outer one of the clutch plates, the recesses defined as spaces in the internal toothing, and wherein a diameter of the cylinder inner circumferential surface corresponds to a tip diameter of the internal toothing.

5. The clutch according to claim 4, further comprising a clutch piston, a pressure plate, and a disk spring, the clutch piston movable axially against the pressure plate and the disk spring under a clutch piston force, wherein the disk spring is prestressed between the retaining ring that is axially fixed in the clutch housing and the clutch piston.

6. An automatic transmission for a motor vehicle, comprising the clutch according to claim 1 and a transmission housing, wherein the clutch housing is connected in a torque-proof manner to the transmission housing.

7. The automatic transmission according to claim 6, wherein the clutch housing and the transmission housing are formed in one piece.

\* \* \* \* \*